United States Patent [19]

Ishida et al.

[11] 4,314,299
[45] Feb. 2, 1982

[54] PAD ASSEMBLY FOR USE IN A MAGNETIC TAPE CASSETTE

[75] Inventors: Toshihiko Ishida; Takateru Satoh, both of Tokyo, Japan

[73] Assignee: TDK Electronics Co., Inc., Tokyo, Japan

[21] Appl. No.: 73,988

[22] Filed: Sep. 10, 1979

[30] Foreign Application Priority Data

Sep. 18, 1978 [JP] Japan .......................... 53-127088[U]

[51] Int. Cl.³ ...................... G11B 23/08; G11B 15/08; G11B 15/60
[52] U.S. Cl. ............................ 360/130.33; 360/132; 242/199
[58] Field of Search ........... 242/199; 360/132, 130.33, 360/130.32, 130.31, 130.3

[56] References Cited

U.S. PATENT DOCUMENTS 3,749,852 7/1973 Moriya et al. ............. 360/133.33 X
4,087,845 5/1978 Saito ............................. 360/132

Primary Examiner—Aristotelis M. Psitos
Attorney, Agent, or Firm—Neuman, Williams, Anderson & Olson

[57] ABSTRACT

A magnetic tape cassette including a pressure pad which consists of a pad piece and a leaf spring holding the piece in place, characterized in that the leaf spring is formed, in one piece, of a pad-piece-holding portion supporting the back side of said pad piece, two wing portions and Y-shaped portions extending from the upper and lower edge sections of the both ends of said pad-piece-holding portion and joining said both wing portions is provided. The present pressure pad is capable of exerting a uniform pressure to a magnetic tape against a magnetic recording and reproducing head of a magnetic tape cassette recorder when said cassette is put in position of the recorder and the recorder is placed in the recording or reproducing mode.

3 Claims, 11 Drawing Figures

PAD ASSEMBLY FOR USE IN A MAGNETIC TAPE CASSETTE

BACKGROUND OF THE INVENTION

This invention relates to a magnetic tape cassette, and more specifically to a cassette with a pressure pad of an improved design.

Ordinary magnetic tape cassettes have a pressure pad as shown in FIG. 1, comprising a leaf spring 1 and a pad piece 2 to press the magnetic tape against the tape head for magnetic recording or playback. Extending the description to FIGS. 3 and 4, the conventional pressure pad consists of a pad piece 2 of felt or the like mounted on the middle portion of a leaf spring 1 which is an elastic metal strip of phosphor bronze or the like bent at both ends to a wide U shape. The entire back side of the pad piece 2 is supported by an enlarged portion of the spring 1, but the force with which the spring urges the magnetized side of the tape against the head is not even, and hence the sensitivity of signal recording and reproduction is not uniform. To be more exact, the pressure of contact with the head that the pad 2 is caused to exert on the magnetic tape 3 running in the direction of the arrow while being pressed against the head is not even across the tape. This will be explained in further detail with reference to FIGS. 2 and 5. In operation of a recorder the magnetic head 4 enters the cassette at its opening into contact with the pressure pad through the magnetic tape 3. As shown in FIG. 5, when the leaf spring 1 forces the magnetic tape 3 against the face 5 of the magnetic head, the tape 3 is subjected to a pressure distributed as indicated by the arrows of varying lengths. Accordingly, the contact pressure of the magnetic tape applicable to magnetic cores 6a, 6b (for left and right channels) set in the side of the magnetic head 4 facing the tape is not uniform; the contact pressure of the tape being exerted on the core 6b is less than that on the core 6a. The recording-reproducing sensitivity of the magnetic tape through the left-channel core 6b is consequently lower. This point will be further clarified later by a comparative description of the present invention. The low contact pressure of the magnetic tape with the left-channel core of the head poses another problem, i.e., wide variation in the recording-reproducing sensitivity. This, too, will be made clear later.

SUMMARY OF THE INVENTION

The present invention has for its object to solve the foregoing problems of the prior art and uniformly enhance the recording-reproducing efficiency by putting an evenly and constantly high pressure on the magnetic cores for left and right channels on the tape.

This objective of the invention is attained by providing a pressure pad which uses a leaf spring of a special structure to support the pad piece.

Briefly, the magnetic tape cassette according to the present invention includes a pressure pad consisting of a pad piece and a leaf spring for holding or retaining said pad piece. The leaf spring is formed in one piece, of a pad-piece-holding portion fixedly supporting the back side of the pad piece, a pair of wing portion and a pair of Y-shaped portions and said Y-shaped portions are connected at their bifurcated ends with the upper and lower edge sections of opposite ends of said pad-piece-holding portion. The other ends of the Y-shaped portions are connected with the wing portions.

The magnetic tape cassette having the thusly constructed pressure pad has a superior performance because of the fact that the pressure pad exerts a uniform pressure to a magnetic tape running past a magnetic recording and reproducing head of a cassette tape recorder. The present magnetic tape cassette is particularly adapted to recording or reproducing of a multi-channel magnetic tape.

BRIEF EXPLANATION OF THE DRAWINGS

The invention will now be described in detail in connection with the drawings, specifically with FIGS. 6 to 8, wherein.

DETAILED EXPLANATION OF THE INVENTION

Figure 6:
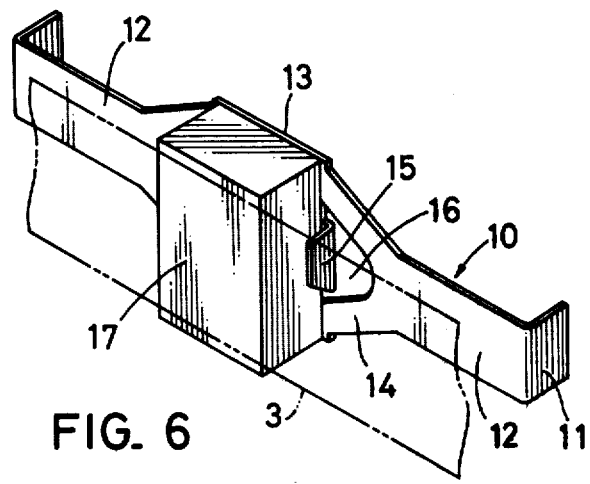
FIG. 6 is a perspective view of a pressure pad embodying the present invention.
Figure 7:
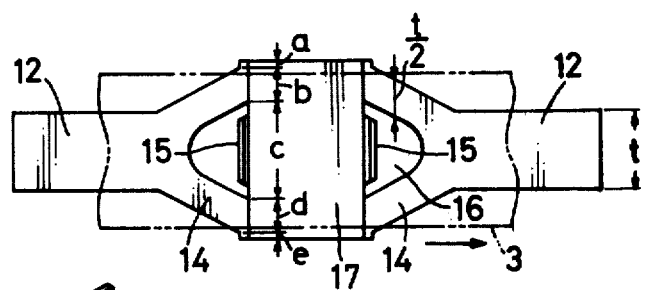
FIG. 7 is a front view of the pad.
Figure 8:
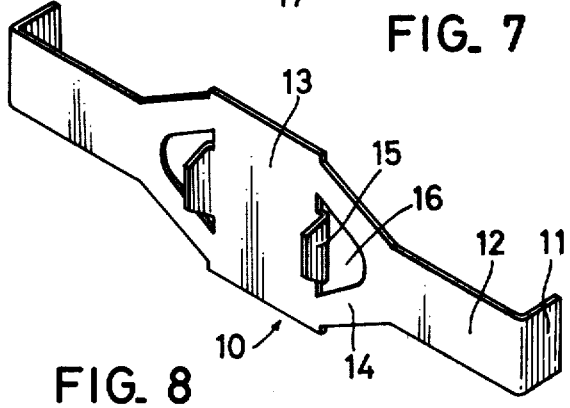
FIG. 8 is a perspective view of the spring of the pressure pad shown in FIGS. 6 and 7.

FIG. 6 is a perspective view and FIG. 7 is a plan view of the pressure pad, and FIG. 8 shows the spring in perspective. The spring 10, obtained by punching from a spring metal sheet, consists, in one piece, of both end or wing portions 12 each terminating in a bent leg 11, a pad-piece-holding portion 13 in the middle, and Y-shaped portions 14 connecting the middle portion with the wing portions. It may further include, though not essential, bent tabs 15 for retaining the pad piece in place. The Y-shaped portions 14 bifurcate inwardly from the both wing portions 12, symmetrically relative to the centerline of the wings, and join the both edge regions of the pad-piece-holding portion. The width of each arm of the Y-shaped portions 14 is desirably t/2 where t is the width of the wing portions 12. This enables the Y-shaped portions to be equal in elasticity to the wing portions. An important feature of the invention is the provision of generally semicircular openings 16 by the Y-shaped portions 14, so that the pad piece can be supported on the spring 10 by both edge regions of the holding portion 13 in the middle. The connections between the Y-shaped portions 14 and the pad-piece-holding portion 13 are so chosen as to correspond to or cover the cores 6a, 6b of the magnetic head for left and right channels when the tape runs in either direction.

The pad piece 17 may be of the same material, size, and shape as the ordinary ones. It is affixed to the holding portion 13 of the spring 10 with an adhesive and is retained in place at both ends by the bent tabs 15.

Figure 9:
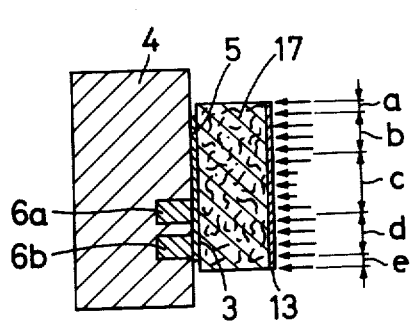
FIG. 9 is a view similar to FIG. 5 but showing the pressure pad of the invention in use.

With the structure described, the pressure pad according to the invention is used as shown in FIG. 9. Since the pad-piece-holding portion 13 of the spring 10 is supported only at the upper and lower edge regions, the head contact pressure, or the pressure exerted by the spring 10 on the face 5 of the magnetic head 4 through the magnetic tape 3, is distributed as indicated by the arrows. The left- and right-channel cores 6a, 6b are subjected to the same degree of pressure. In the figure the symbols a through e designate sections corresponding to those shown in FIG. 7. On the cores 6a, 6b, pressure of the section d is applied when the "A" side of the tape faces the cores, or the pressure of the section b is applied when the "B" side faces the cores, and in either case less pressure is applied by the rest of sections, a, c, and e.

Figure 1:
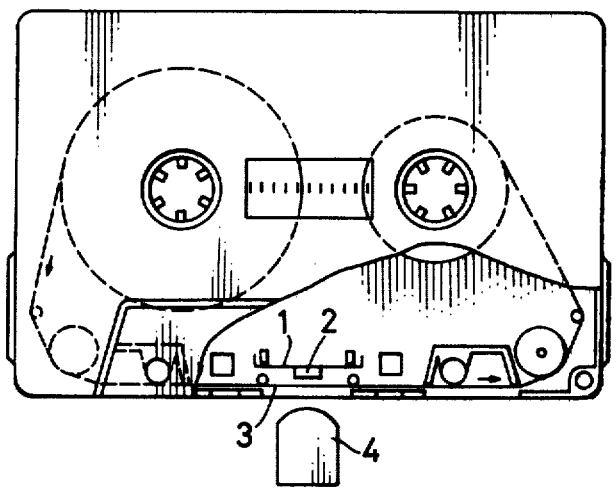
FIG. 1 is a plan view of a magnetic tape cassette, partly broken to illustrate the construction.
Figure 2:
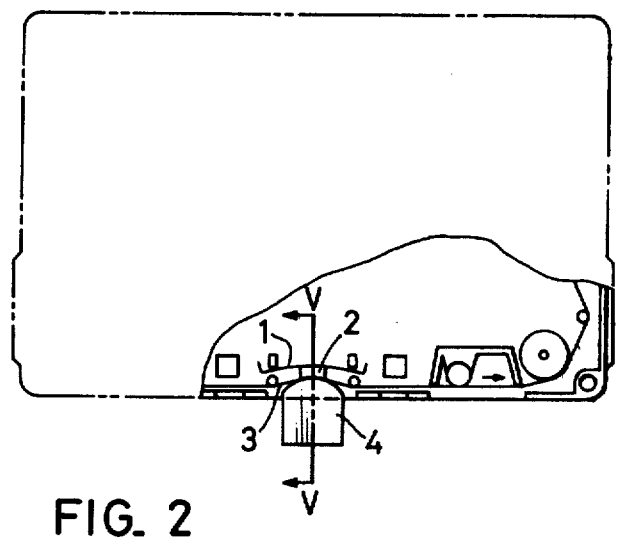
FIG. 2 is a partly sectional plan view of the cassette in use.
Figure 3:
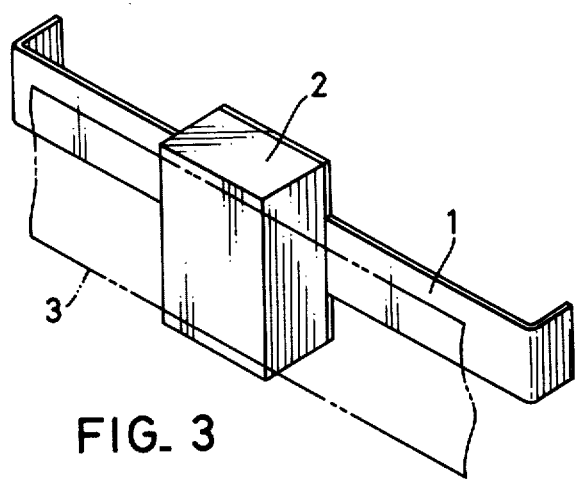
FIG. 3 is a perspective view of a conventional pressure pad.
Figure 4:
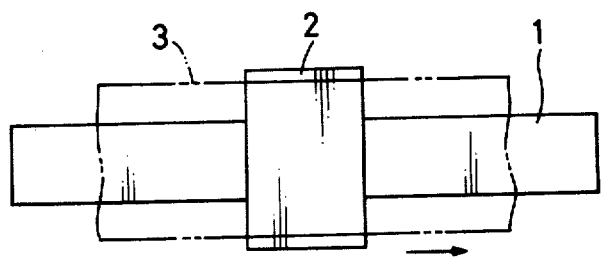
FIG. 4 is a front view of the conventional pad.
Figure 5:
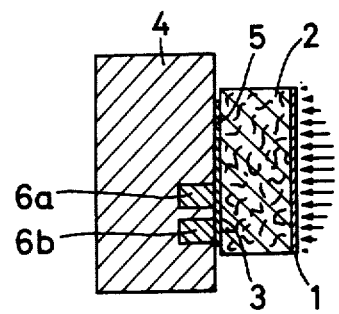
FIG. 5 is a sectional view looking in the direction of the arrows A—A of FIG. 2, showing the pressure pad of FIGS. 3 and 4 in use.
Figure 10:
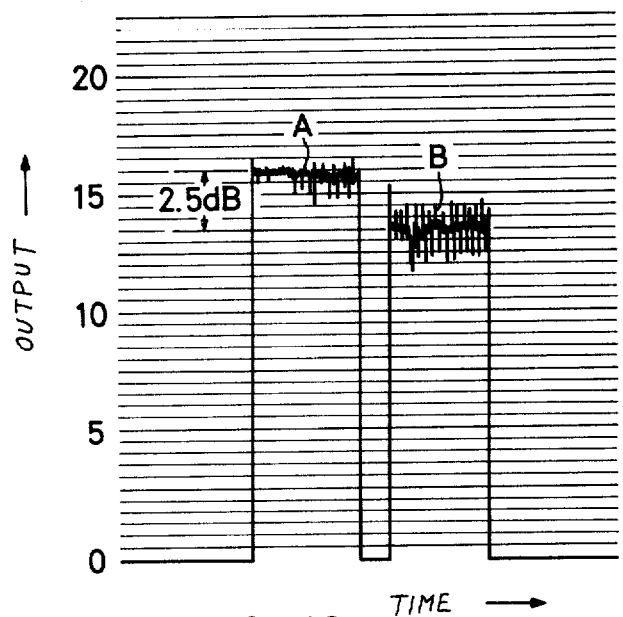
FIG. 10 is a graph comparing the reproducing output characteristics of tapes using the pressure pads of the prior art and of the invention.

As will be appreciated from the above description, the present invention eliminates the difference in recording-reproducing sensitivity between the left and right channels on each track of a magnetic tape. This has been proved by actual measurements. FIG. 10 shows the playback characteristics of the same magnetic tapes that have recorded 8 kHz signals. The curve A represents the characteristic of the tape which played back the signals recorded in the left channel of the track (with the core 6b) by use of the pressure pad 10 according to the invention, and the curve B represents the characteristic by use of the conventional pressure pad 1 shown in FIG. 1. In the graph the numerical values of output (in dB) given are arbitrary; it is to be understood by those skilled in the art that the intervals do make sense. As is manifest from the curves A and B, the pressure pad of the invention gives a reproducing output greater than the ordinary one by approximately 2.5 dB. Also, observation of the waveform makes it clear that the output variation is limited. With the conventional pressure pad, by contrast, the reproducing output is small and the waveform is highly variable.

Figure 11:
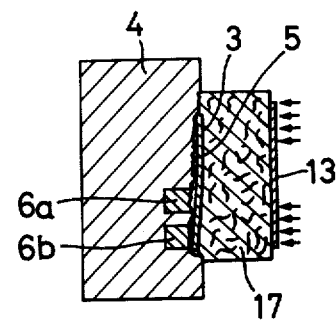
FIG. 11 is a view similar to FIG. 5 but showing the pressure pad of the invention in another mode of employment.

Even with a magnetic head having a worn face 5 as indicated in FIG. 11, a sufficiently high pressure is applied on its cores 6a, 6b to give good results either in recording or in playback.

It will be understood from the foregoing description that the present invention improves the recording and playback characteristics of magnetic tape cassettes. It will also be obvious to those skilled in the art that various changes and modifications may be made within the scope of the invention.

What we claim is:

1. A pressure pad assembly for a magnetic tape cassette, said assembly comprising a substantially rectangular pad piece and a one-piece leaf spring for retaining said pad piece relative to a magnetic head having magnetic cores set therein; said leaf spring comprising a generally rectangular retaining portion for supporting the back side of said pad piece; two wing portions connected to opposed edges of said pad retaining portion; Y-shaped portions each having two legs extending from upper and lower sections of said opposite edges of said retaining portion joining the edge sections to said wing portions; the regions where said two legs of each Y portion and said retaining portion are joined together bein aligned with and overlying a core set in such recorder magnetic head.

2. A magnetic tape cassette according to claim 1, in which the combined width of the two arms of each said Y-shaped portion is substantially equal to the width of each said wing portions.

3. A magnetic tape cassette according to claim 1, in which said pad-piece-holding portion has on both ends retaining tabs bent toward the both ends of said pad piece.

* * * * *